United States Patent
Nashiki et al.

[11] Patent Number: 5,936,372
[45] Date of Patent: Aug. 10, 1999

[54] CONTROL DEVICE FOR A RELUCTANCE TYPE SYNCHRONOUS MOTOR

[75] Inventors: Masayuki Nashiki; Akiyoshi Satake, both of Niwa-gun, Japan

[73] Assignee: Okuma Corporation, Nagoya, Japan

[21] Appl. No.: 08/867,528

[22] Filed: Jun. 2, 1997

[30] Foreign Application Priority Data

Jun. 6, 1996 [JP] Japan .................................. 8-143883

[51] Int. Cl.[6] ...................................................... H02P 1/46
[52] U.S. Cl. .......................... 318/701; 318/715; 318/254; 318/432; 318/433; 318/434
[58] Field of Search .................. 361/31, 91, 87; 318/609, 610, 700, 701, 254, 715, 432, 433, 434

[56] References Cited

U.S. PATENT DOCUMENTS

| | | | |
|---|---|---|---|
| 3,649,897 | 3/1972 | Messick | 318/434 |
| 4,019,107 | 4/1977 | Dixon et al. | 318/338 |
| 4,268,781 | 5/1981 | Kawada et al. | 318/434 |
| 4,322,668 | 3/1982 | Trussler et al. | 318/434 |
| 4,743,825 | 5/1988 | Nashiki . | |
| 5,040,088 | 8/1991 | Harrington et al. | 361/31 |
| 5,059,880 | 10/1991 | Hiroi | 318/610 |
| 5,334,923 | 8/1994 | Lorenz et al. | 318/805 |

*Primary Examiner*—William M. Shoop, Jr.
*Assistant Examiner*—Rita Leykin
*Attorney, Agent, or Firm*—Oliff & Berridge, PLC

[57] ABSTRACT

In an armature current limit value calculator section, limitation is applied to a pre-limitation torque command ST in correspondence with a presently detected speed SPD, to calculate a torque command STC. Meanwhile, in a field current calculator section 12, a pre-correction field current command value SF is decreased in correspondence with the detected speed SPD when the speed is large. In addition, a coefficient $K\tau$ which increases when the torque command is large is calculated on the basis of the pre-limitation torque command ST at this time. Further, a field current command is calculated from an equation $SFC = K\tau \ast SF$. A current command calculator section 3 prepares a current command on the basis of the torque command STC and the field current command SFC supplied, and drives an electric motor 5 via a current control section 4.

6 Claims, 6 Drawing Sheets

CONTROL DEVICE FOR A RELUCTANCE TYPE SYNCHRONOUS MOTOR

BACKGROUND OF THE INVENTION

1. Technical Field of the Invention

The present invention relates to a control device for a synchronous motor used in a machine tool or the like, and particularly to a control device for a reluctance type synchronous motor.

2. Description of the Prior Art

A permanent magnet type synchronous electric motor which adopts a permanent magnet as a rotor has conventionally been used as an electric motor for positioning or shaft feeding in a machine tool or the like. To control the output torque of this motor, only the amplitude of the armature current (or torque current) needs to be controlled by a control device. In this motor, however, since the magnetomotive force of the field magnetism (or magnet) cannot be controlled, the field magnetism cannot be arbitrarily controlled using field magnetism weakening control (or rated output control) or the like. Consequently, the inductive voltage between terminals exceeds the power source voltage when the rotation speed reaches or exceeds a designed rotation speed (which will be called a base rotation speed), resulting in a problem that control of the output torque is rendered unstable.

Therefore, a reluctance type electric motor whose d-axis (or field magnetism) current and q-axis (or electric motor) current can be independently controlled is used in place of the permanent magnet type electric motor. By using this reluctance type electric motor, the d-axis current can be weakened in correspondence with the rotor speed when the rotation speed reaches or exceeds the base speed (i.e., the magnetomotive force can be reduced in the case of a permanent magnet). Thus, stable control of the output torque is achieved when the rotation speed is equal to or higher than the base speed).

FIG. 8 shows a control block diagram according to the prior art. A difference between a speed command SVC and a speed detection value SPD is calculated by a subtracter 1. Based on the difference, a PI controller 2 generates a q-axis (or electric motor) current command STC which is supplied to a current command calculator section 3 by the PI controller 2. Meanwhile, a field current calculator section 81 generates a d-axis (or field magnetism) current command SFC from a speed detection value SPD, and supplies this command to the current command calculator section 3. The current command calculator section 3 generates U-phase and V-phase current commands SIUC and SIVC from a detection value SP of the rotor position detected by a detector 6, and supplies these commands to a current control section 4. Based on the commands supplied, the current control section 4 controls the current to be supplied to an electric motor 5. Note that a differentiator 7 generates the speed detection value SPD from the detection value SP of the rotor position. In addition, the field current calculator section 81 outputs a field current command according to a function pattern shown in FIG. 3(a) (in which the function takes a constant value when the speed is equal to or lower than a base rotation speed SPDbase while the function satisfies a curve 31 when the speed is equal to or higher than the base rotation speed SPDbase.

In this conventional control device for a synchronous electric motor, field current control depends only on the rotor speed SPD. Further, field magnetism weakening control is carried out only when the rotation speed is equal to or higher than the base rotation speed SPDbase. Therefore, 100% of the field current flows even when no torque is required, e.g., while the motor is stopped. A problem therefore occurs not only in that the electric power consumption is large but also in that the electric motor itself becomes heated. If the field current is large, the torque ripple becomes large, as is apparent from the characteristic graph shown in FIG. 7. Therefore, in the case where the motor is used for a feed shaft of a machine tool, influences from the torque ripple appear as processing fringes, thus resulting in reductions in processing accuracy.

In addition, when the field magnetism is constant, the torque generated is limited, resulting in a problem that the acceleration time and deceleration time cannot be shortened. Further, when the motor current is large (e.g., where STC>>SFC), almost all components of a current command value as a synthesis current serve as motor current components. Therefore, when a delay of control timing occurs in a electric current control loop or the like, there occurs a problem that a current command comes to include motor current components including such field current components which may inversely rotate the rotor, resulting in a phenomenon where the rotor stops or is inversely rotated and is finally rendered uncontrollable while a command for regular rotation is generated.

BRIEF SUMMARY OF THE INVENTION

The present invention has been made in view of the above problems, and has an object of providing a control device for a reluctance type synchronous motor, which attains a high controllability and an excellent efficiency with a low power consumption.

According to the control device of the present invention, the amplitude of a field current is decided on the basis of both the rotor speed and the torque command value. In addition, the amplitude of the armature current is limited by a rotor current limit value decided on the basis of the rotor speed.

Further, the amplitude of a d-axis (field) current is calculated on the basis of the rotor speed and the torque command value. Therefore, the field current can be decreased when a large torque is not required, and as a result, the power consumption and heat generation of the electric motor can be reduced. When a torque is required for rapid acceleration or the like, the torque generated can be increased by increasing the d-axis current, so that the acceleration time and the deceleration time of the electric motor can be shortened. Further, when a torque is relatively not required, e.g., when cutting a work piece, the torque ripple can be reduced by reducing the field current, and thus, processing accuracy can be improved.

Since the limit value of a q-axis (armature) current is arranged so as to change in accordance with the rotation speed, saturation of an inductive voltage can be reduced, so that efficient and stable control can be realized.

Thus, the control device for a synchronous motor according to he present invention comprises a field current calculator section for calculating a field current command value, referring to the rotor speed and the torque command value. Therefore, the field current can be actively controlled and the field current can be decreased when the torque is small. As a result, the power can be saved and the heat generation of coils can be reduced. If a large torque is needed, e.g., when rotation is accelerated or decelerated, the torque constant can be increased by increasing the field current command, so that the acceleration time can be shortened.

Further, the armature current can be instructed within a range of a limit value, by providing an armature current limit value calculator section for calculating a limit value depending on a function pattern in correspondence with the rotor speed during calculation of an electric current. Therefore, a reluctance type synchronous electric motor can be subjected to control equivalent to a permanent magnet type synchronous electric motor.

The present invention is not limited to the scope as described above, but may modified without deviating from the subject matter of the invention. For example, the present invention may be applied to a linear reluctance type synchronous electric motor.

DETAILED DESCRIPTION OF THE INVENTION

Figure 1:
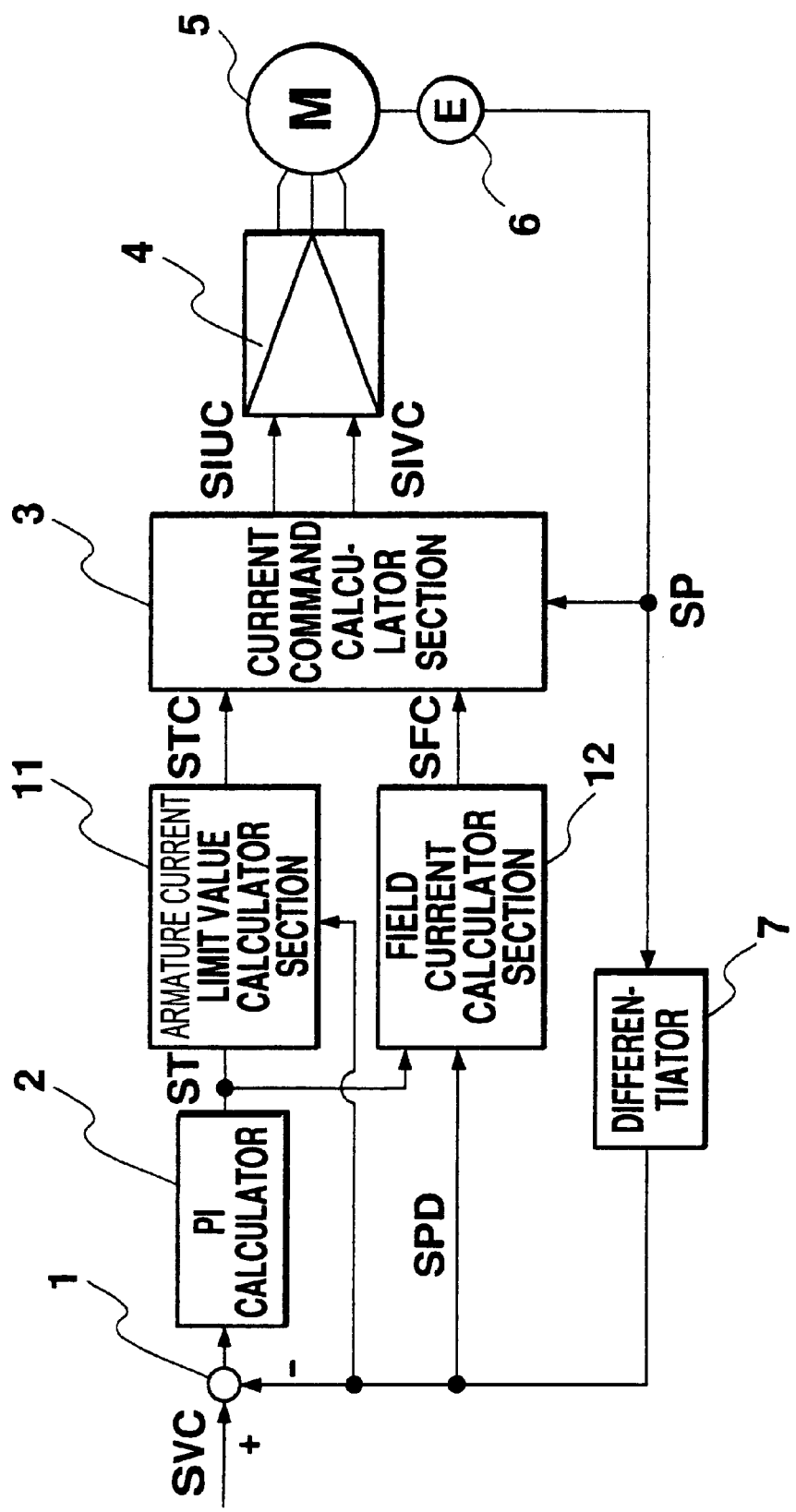
FIG. 1 is a block diagram showing an example of a control device according to the present invention.
Figure 8:
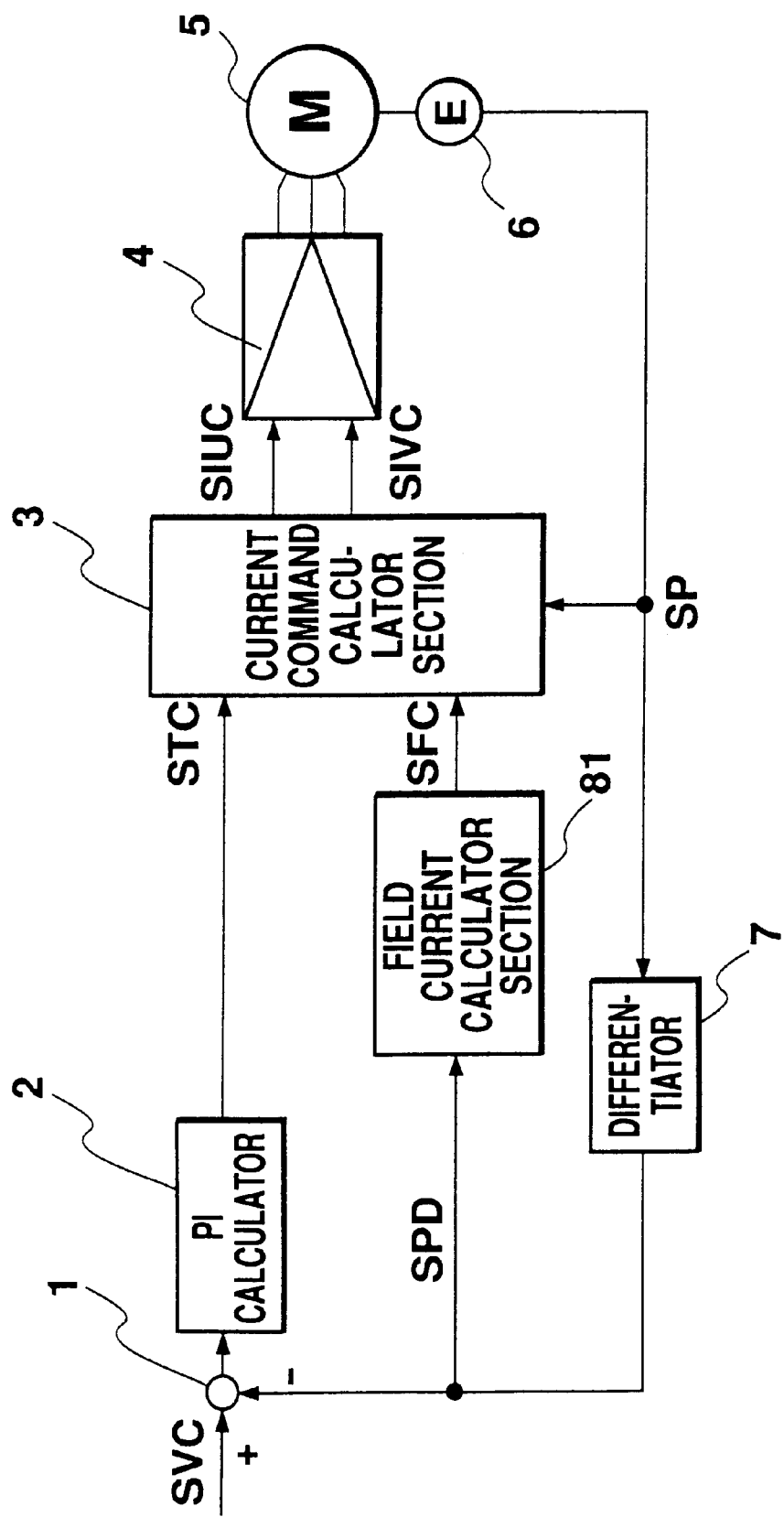
FIG. 8 is a block diagram showing an example of a control device according to the prior art.

In the following, a preferred embodiment of the present invention will be explained on the basis of the drawing. FIG. 1 shows an example of a basic block of the control device for a synchronous electric motor according to the present invention. Note that FIG. 1 corresponds to FIG. 8 and the components or signals denoted by same references have the same functions.

A speed command value SVC from a host control device is initially supplied to a subtracter 1. This subtracter 1 performs subtraction between the speed command value SVC and a speed detection value SPD of a rotor detected, to calculate speed error. Further, the speed error thus obtained is supplied to a PI control device 2 and is multiplied by a speed loop gain, to generate a torque command ST. The torque command thus obtained is supplied to an armature current limit value calculator section 11. The electric motor limit value calculator section 11 applies a predetermined limitation on the armature current and supplies an armature current command STC obtained to a current command calculator section 3.

A field current calculator section 12 generates a field current amplitude value SFC, corresponding to a speed detection value SPD and a torque command value ST, and supplies the value SFC to the current command calculator section 3. The speed detection value SPD is obtained by processing a detection value SP of the position of the electric motor rotor from a detector 6, through a differentiator 7.

Figure 4:
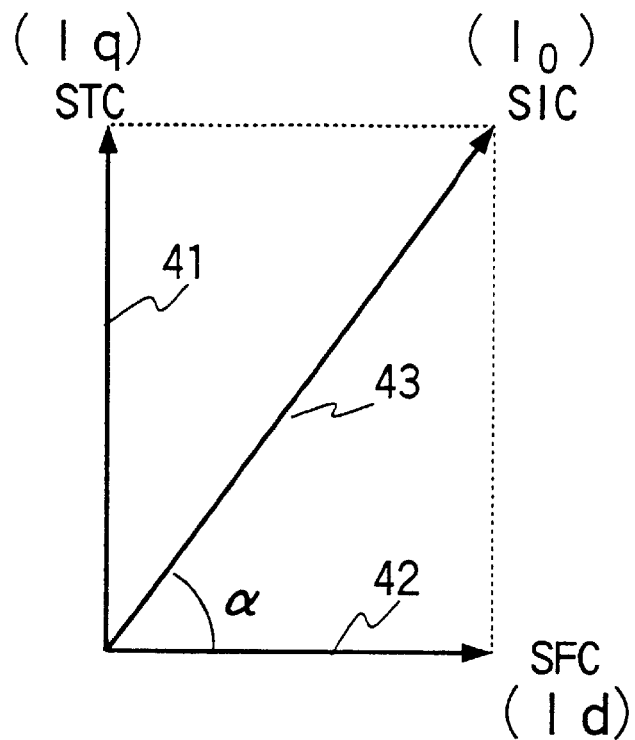
FIG. 4 is a graph showing a current vector.

In the current command calculator section 3, the armature current STC as an armature current amplitude and the field current command SFC as a field current amplitude are subjected to vector synthesis and a current command value SIC is set thereafter. Note that multiplication by a sine wave phase corresponding to the rotor position SP is performed to generate a current command having a phase corresponding to the electric motor position. Here, as shown in FIG. 4, it is assumed that the field current command SFC and the armature current command STC have phases shifted by an electric angle of p π/2 from each other in vector calculation and the angle between the synthesis current command value SIC and the field current command value SFC is α.

Next, a U-shaped current command SIUC and a V-phase current command SIVC obtained from the current command value SIC are outputted to a current control section 4 comprising a current amplifier section, a current feedback section, a 2/3-phase converter section, or the like.

The current control section 4 has a plurality of switching transistors and generates a 3-phase alternating current by switching the transistors, which is applied to an electric motor 5. In this manner, the electric motor is operated as a synchronous electric motor by a current corresponding to the rotor position SP.

Figure 2:
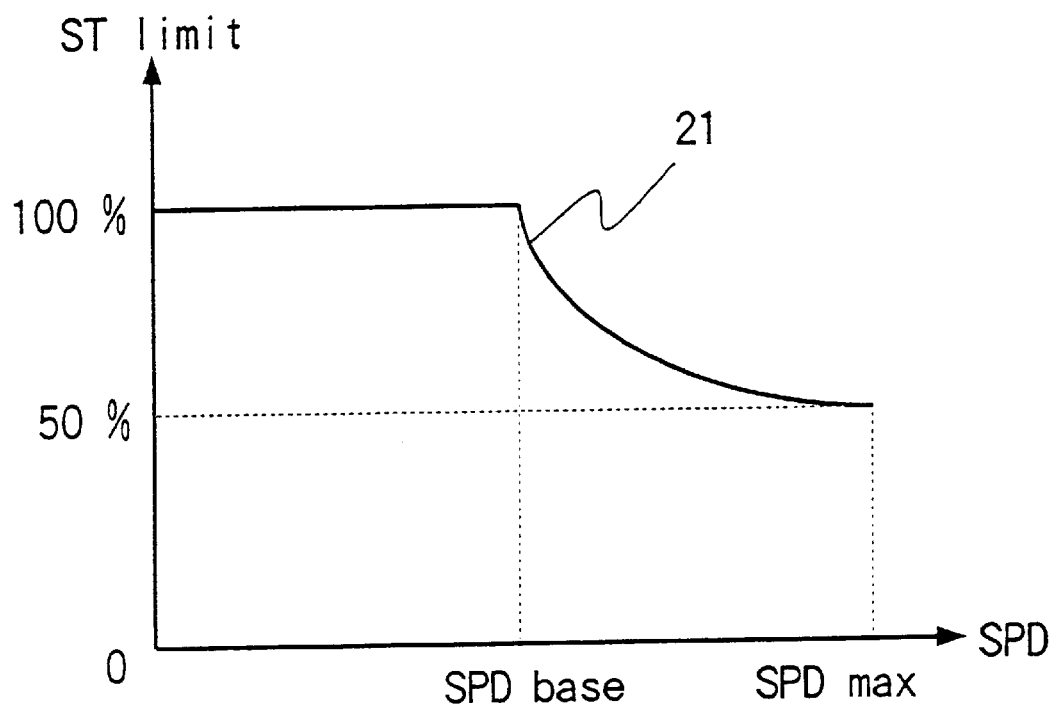
FIG. 2 is a graph showing an example of a function pattern in a motor current limit value calculator section according to the present invention.

FIG. 2 shows an example of a limit value calculation function of the armature current limit value calculator section 11. Although the limit value STlimit varies depending on the rotor speed SPD, no particular limit value is set (i.e., the torque is 100%) until the electric motor reaches the base rotation speed SPD. While a limit value is set, the rotation speed is the base rotation speed SPDbase to the maximum rotation speed SPDmax (i.e., during field magnetism weakening control), in this example. In many cases, this function is decided by the performance of the current amplifier and is normally maintained to be constant (i.e., the torque is 100%).

However, in the case where the armature current is greater than the field current due to the structure of a rotor of an electric motor (i.e., where STC>>SFC is satisfied, such as in a case in which the armature current greatly influences the field current particularly during field magnetism weakening control or the like), it has been found that the inductive current between terminals is increased and a current cannot flow as a command requires even though the field magnetism weakening is being carried out. This phenomenon frequently appears in the case of using a rotor having a low inductance ratio between the d-axis and the q-axis and is greatly influenced by a leakage inductance between the d-axis and the q-axis.

In this condition, a drawback may also occur in that the electric motor is rendered uncontrollable at worst case (e.g., the motor stops or inversely rotates while a regular rotation is instructed). In this embodiment, the characteristic during field magnetism weakening control is improved by setting a limit value STlimit (FIG. 2) using a rotor speed SPD as a function in the armature current command ST.

Figure 3A:
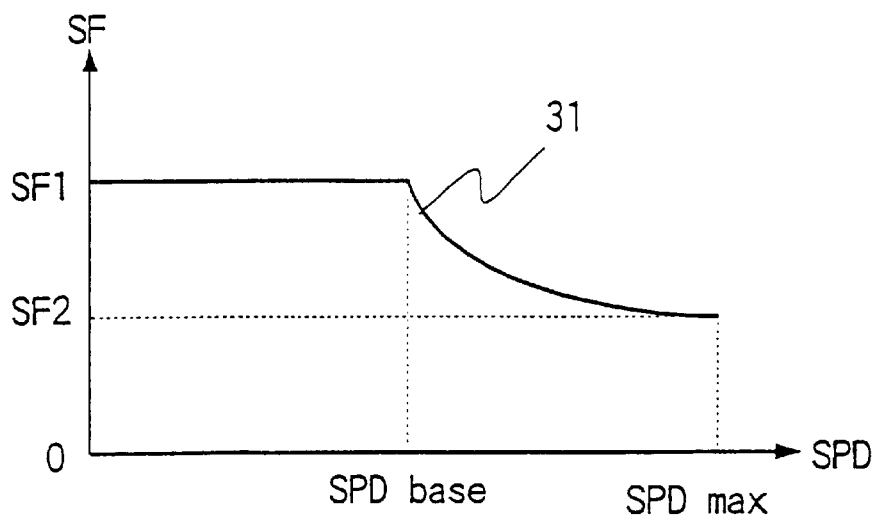
FIG. 3(a) is a graph showing a function pattern which defines a relationship between a rotor speed and a field current command before correction, in a field current calculator section.
Figure 3B:
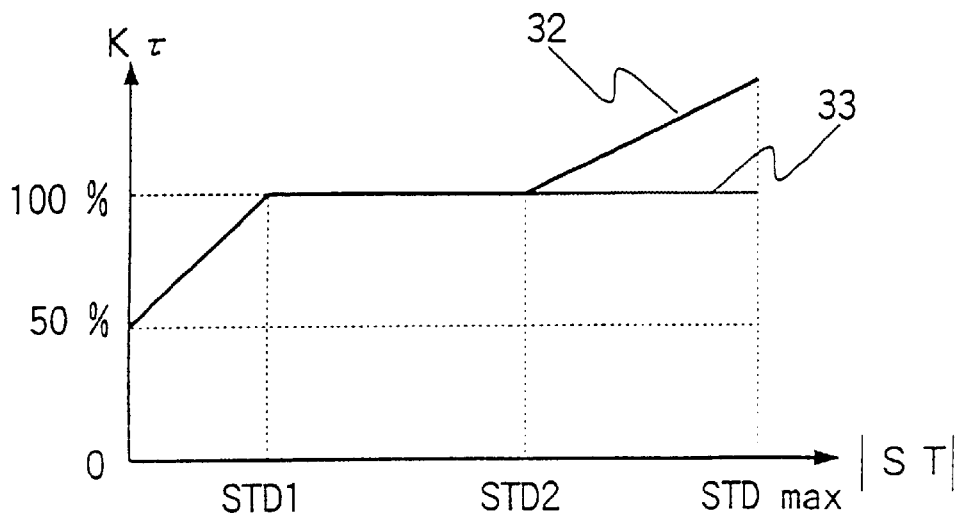
FIG. 3(b) is a graph showing is a function pattern which defines a relationship between a torque command value and a coefficient, in a field current calculator section.

FIGS. 3(a) and 3(b) show an example of function processing in the field current calculator section 12. The field current calculator section 12 adopts a function pattern of FIG. 3(a) for calculating a pre-correction field current command SF referring to a rotor speed SP, like in the prior art, and a function pattern of FIG. 3(b) for calculating a coefficient Kτ, referring to a pre-limit torque command value ST.

The function pattern of FIG. 3(a) referring to the rotor speed SP is the same as the prior art. A value SF obtained by the function pattern of FIG. 3(a) is used as a pre-correction field current command value SF, and a pre-correction field current command value ST is multiplied by a coefficient Kτ by a multiplier not shown in the drawing, to output a field current command value SFC (SFC=KτSF).

The correction coefficient Kτ will now be explained. This coefficient is set such that the value of the field current command is decreased when the pre-limit torque command ST is small (e.g., when the motor stops and maintains constant rotation), while the coefficient Kτ is set to 100% or more when a large torque is required, e.g., during acceleration or the like. Thus, not field magnetism weakening control but field magnetism strengthening control is performed. Note that the coefficient Kτ does not take a value which will increase the field magnetism during field magnetism weakening control.

As a result of this, it is possible to reduce the field current when not much torque is required, e.g., when the motor is stopped. Thus, since no wasteful current flows, the power consumption can be reduced. In addition, heat generated from the electric motor itself is reduced, so that there is an advantage that no forced air-cooling operation is required while the motor is stopped. Further, since it is possible to increase the field current and the torque constant during acceleration, the acceleration time and the deceleration time can be shortened.

In the following, basic performance of the a reluctance type electric motor according to the present embodiment will be schematically explained with reference to FIGS. 5 to 7.

Figure 5:
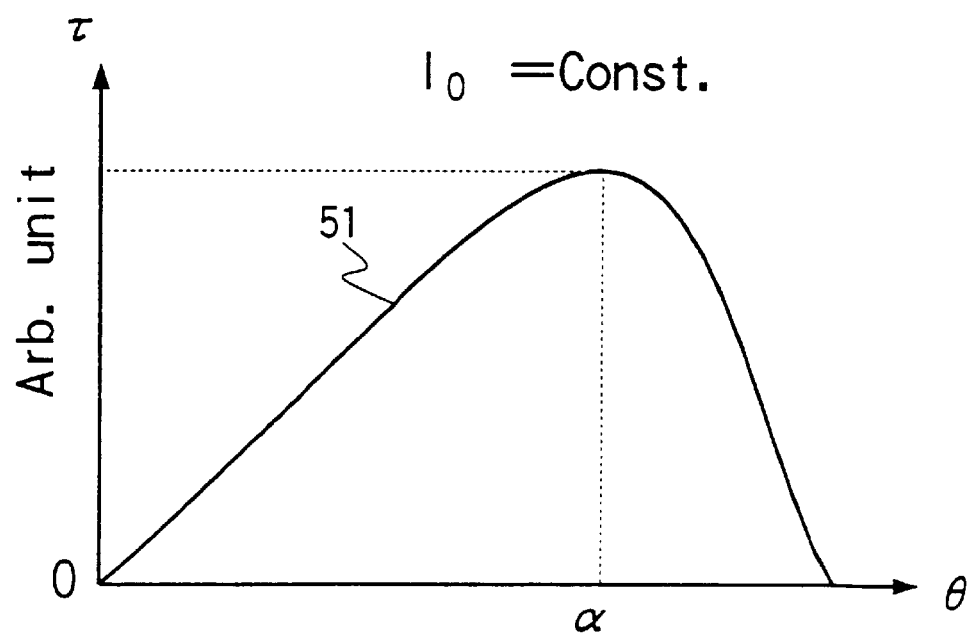
FIG. 5 is a graph showing an example of a characteristic (θ-τ characteristic) of an electric motor according to the present invention.

FIG. 5 shows torque τ generated with respect to a rotor rotation angle θ when a constant direct current (e.g., U to V, W-phase) flows. The characteristic takes a peak at an angle α as shown in the figure. Since the angle α which provides the peak value changes depending on the structure of a rotor, the clearance between a stator and a rotor, and the flowing current, basic characteristics of a designed electric motor should preferably be previously measured and stored as control parameters during control. However, if it is difficult to measure the characteristics, a rated field current may be calculated from a rated current after the angle α is decided, since the angle α has been found to take a value of about $(\pi/4)\pm(\pi/12)$ radians from experiments. In this case, the following relationship exists between the rated field current Id and the rated current IO as is apparent from the vector graph in FIG. 4.

EQUATION 1

$$Id = IO\cos(\alpha) \qquad \text{equation (1)}$$

Figure 6:
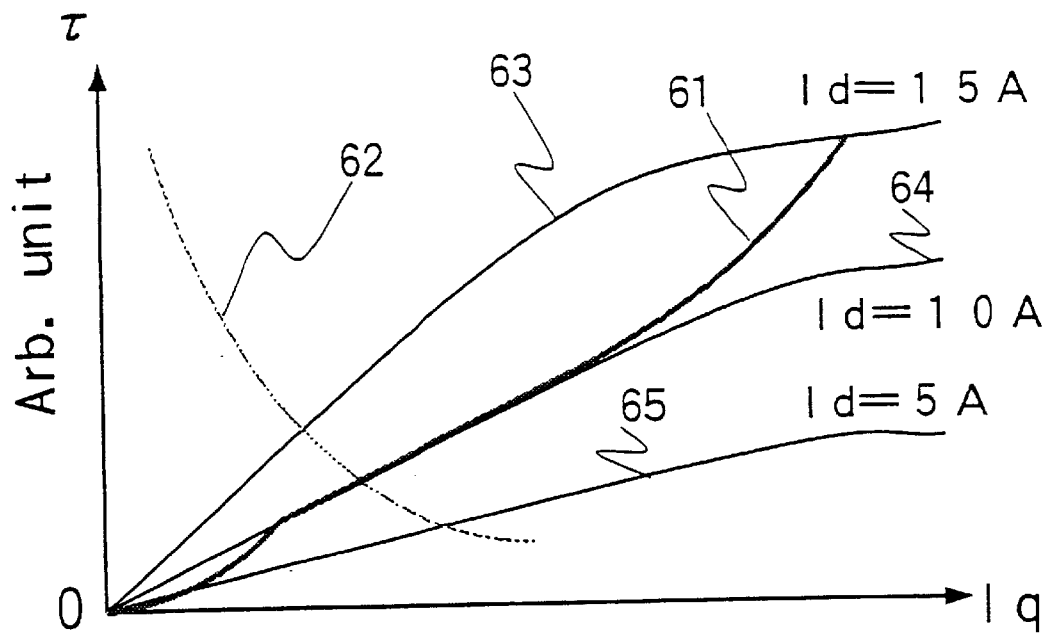
FIG. 6 is a graph showing an example of a characteristic (Iq-τ (Id) characteristic) of an electric motor according to the present invention.

FIG. 6 shows output torque characteristic of the field current Id with respect to an armature current Iq. The characteristic is substantially linear up to a value several times as large as a rated current (indicated by a rated characteristic curve 62) normally used. In case where the field current is fixed, it is possible to control the electric motor with a controllability equivalent to a synchronous motor of a permanent magnet type. In this embodiment, the field current is changed with respect to a torque command, and the torque characteristic is as indicated by the torque curve 61.

Figure 7:
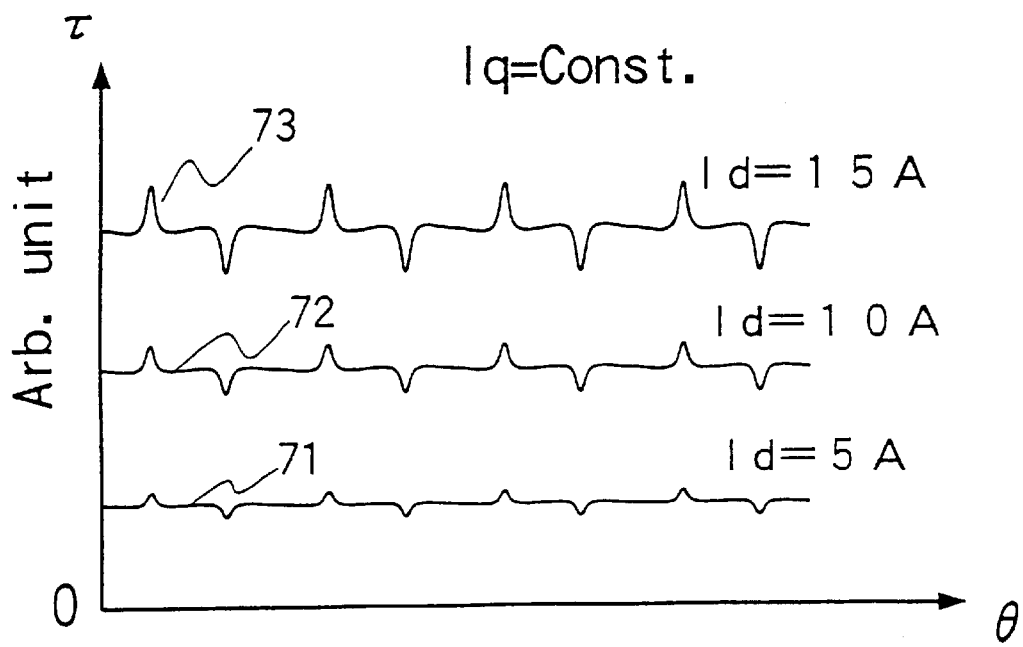
FIG. 7 is a graph showing an example of a characteristic (triple ripple characteristic) of an electric motor according to the present invention.

FIG. 7 shows output torque characteristic of the field current Id with respect to a rotation angle θ of the rotor. As is apparent from the figure, if an equal motor current Iq is used, the greater the field current, the larger the torque ripple. Hence, in the case of cutting a work piece with a low torque, the torque ripple is decreased since the field current is weakened and the processing accuracy is increased.

Note that relationships concerning calculations necessary for an armature current command and a field current command may be previously stored in the form of a table, and a value corresponding to an input value may be read out. Otherwise, functions may be stored and those commands may be calculated from an input value.

What is claimed is:

1. A control device for controlling current supply to a synchronous electric motor, comprising a rotor made of soft magnetic material and internally provided with magnetism insulating means such that a surface magnetic resistance changes in a circumferential direction, and a stator provided close to the rotor to generate a rotation magnetic field magnetism for rotating the rotor, the control device further comprising:

rotation speed detection means for detecting a rotor speed of the rotor;

an armature current calculator section for calculating an electric motor command value, based on a torque command value as a target value of an output torque of the synchronous electric motor;

a field current calculator section for calculating a field current command value, based on both of a rotation speed of the rotor and the torque command value; and a current command calculator section for calculating a current command relating to a current to be supplied to the synchronous electric motor, based on the armature current command and the field current command obtained.

2. A control device according to claim 1, wherein the armature current calculator section limits an amplitude of the armature current to an armature current limit value which changes in accordance with the rotor speed.

3. A control device according to claim 2, wherein the limitation is applied in a manner in which no limitation is applied until the rotation speed reaches a predetermined rotor speed and a limitation is applied in accordance with a predetermined relationship such that the armature current command is decreased to be lower than a value corresponding to the torque command when the rotation speed is equal to or higher than the predetermined rotation speed.

4. A control device according to claim 1, wherein the field current calculator section obtains a pre-correction field current command value from the rotation speed of the rotor, calculates a correction coefficient based on the torque command value, and multiplies the pre-correction field current command value by the correction coefficient, to calculate a corrected field current command value.

5. A control device according to claim 4, wherein the correction coefficient is 1 or less when the torque command value is a predetermined low value or less and the correction coefficient is 1 or more when the torque command value is a predetermined high value or more.

6. An electric synchronous motor which operates in accordance with an output torque command externally supplied, comprising:

a rotor made of soft magnetic material and internally provided with magnetism insulating means such that a surface magnetic resistance changes in a circumferential direction;

a stator provided close to the rotor to generate a rotation magnetic field magnetism for rotating the rotor; rotation speed detection means for detecting a rotor speed of the rotor;

an armature current calculator section for calculating an electric motor command value, based on a torque command value as a target value of an output torque of the synchronous electric motor;

a field current calculator section for calculating a field current command value, based on both of a rotation speed of the rotor and the torque command value; and a current command calculator section for calculating a current command relating to a current to be supplied to the synchronous electric motor, based on the armature current command and the field current command obtained.

* * * * *